(12) United States Patent
Johnston (10) Patent No.: US 11,414,022 B2
(45) Date of Patent: Aug. 16, 2022

(54) TRUCK TOOLBOX-BED COVER INTERFACES, INTEGRATED TOOLBOX ASSEMBLIES, AND RELATED ACCESSORIES

(71) Applicant: James Harrison Johnston, Newnan, GA (US)

(72) Inventor: James Harrison Johnston, Newnan, GA (US)

( * ) Notice: Subject to any disclaimer, the term of this patent is extended or adjusted under 35 U.S.C. 154(b) by 0 days.

(21) Appl. No.: 17/344,696

(22) Filed: Jun. 10, 2021

(65) Prior Publication Data

US 2022/0169185 A1    Jun. 2, 2022

Related U.S. Application Data

(60) Provisional application No. 63/117,452, filed on Nov. 23, 2020.

(51) Int. Cl.
| B60R 9/06 | (2006.01) |
| B60R 11/06 | (2006.01) |
| B60J 7/16 | (2006.01) |
| B60J 7/14 | (2006.01) |
| B60J 7/08 | (2006.01) |

(52) U.S. Cl.
CPC ............ B60R 9/065 (2013.01); *B60J 7/085* (2013.01); *B60J 7/141* (2013.01); *B60J 7/1607* (2013.01); *B60R 11/06* (2013.01)

(58) Field of Classification Search
CPC ...... B60J 7/1607; B60J 7/1614; B60J 7/1621; B60J 7/085; B60J 7/141; B60R 11/06; B60R 9/065
See application file for complete search history.

(56) References Cited

U.S. PATENT DOCUMENTS

| 4,580,827 A | * | 4/1986 | Feagan | B60R 11/06 224/404 |
| 5,758,921 A | * | 6/1998 | Hall | B60P 7/04 296/100.11 |
| 6,053,556 A | * | 4/2000 | Webb | B60J 7/085 296/100.15 |
| D434,361 S | * | 11/2000 | Block | D12/401 |
| 6,234,559 B1 | * | 5/2001 | Block | B60J 7/1621 296/100.06 |
| 6,276,735 B1 | * | 8/2001 | Champion | B60R 11/06 296/100.1 |
| 6,899,372 B1 | * | 5/2005 | Keller | B60J 7/141 296/100.1 |
| 7,021,693 B2 | * | 4/2006 | Keller | B60J 7/141 296/100.1 |

(Continued)

*Primary Examiner* — Justin M Larson
(74) *Attorney, Agent, or Firm* — Cygnet IP Law, P.A.; Stephen W. Aycock, II (57) ABSTRACT

Described is a truck toolbox-bed cover interface constructed to seals the cargo area of a vehicle between a truck bed cover and a storage container, where the truck toolbox-bed cover interface does not obstruct access to the handles on the back side of a storage container. Some implementations can include a toolbox integrated with a truck toolbox-bed cover interface, a bedcover integrated with a truck toolbox-bed cover interface, and a complete integrated assembly including a toolbox, a bedcover, and a truck toolbox-bed cover interface. Some implementations can include a toolbox with a cooler rail or a tactical rail.

7 Claims, 14 Drawing Sheets

(56) References Cited

U.S. PATENT DOCUMENTS

| | | | |
|---|---|---|---|
| 8,931,819 B2* | 1/2015 | Daniel | B60R 9/055 |
| | | | 296/37.6 |
| 9,889,728 B2* | 2/2018 | Chapman | B60J 7/1607 |
| D829,634 S * | 10/2018 | Chapman | D12/401 |
| 10,457,124 B2* | 10/2019 | Bernardo | B60J 7/1607 |
| 10,632,934 B2* | 4/2020 | Linn | B60J 7/102 |
| 2006/0102669 A1* | 5/2006 | Fouts | B60R 9/00 |
| | | | 224/404 |
| 2019/0351748 A1* | 11/2019 | Ford | B60J 7/20 |
| 2021/0053506 A1* | 2/2021 | Spencer | B60R 11/06 |
| 2021/0284002 A1* | 9/2021 | Bernardo | B60J 7/1607 |

* cited by examiner

TRUCK TOOLBOX-BED COVER INTERFACES, INTEGRATED TOOLBOX ASSEMBLIES, AND RELATED ACCESSORIES

RELATED APPLICATIONS

This application claims the benefit of U.S. Provisional Patent Application No. 63/117,452, entitled "Truck Toolbox-Bed Cover With Interface," and filed on Nov. 23, 2020, which is incorporated herein by reference in its entirety.

FIELD

Some implementations relate generally to accessories for a truck with toolbox and a bed cover, and, more particularly, to a truck toolbox-bed cover interface that provides a drain for rainwater and does not prohibit access to toolbox handles while the cover is in the closed position.

BACKGROUND

Truck bed covers are used to cover the cargo area of a vehicle such as the cargo box of a pick-up truck. A typical truck bed cover includes a waterproof material, and a frame support which extends along the perimeter of the top of the cargo box. The material is attached to the frame support via a quick release types of fasteners (e.g., snaps, magnets, Velcro, etc.) and can be removed to allow access to the cargo area. The frame support includes a set of rails attached to the top of the side walls and front and back walls of the cargo box. Often a storage container (or toolbox) is mounted in the front of the cargo box of the truck and extends across the width of the cargo box. This can make it difficult to fasten the front rail of the frame support against the back end of the storage container to form a watertight seal keeping the cargo box dry.

In some cases, an angled bracket is placed between the storage container and the front rail of the frame support, such that the front rail overlaps the horizontal portion of the bracket. However, sometimes the handles to open the storage container are located along the back edge and the angled bracket can obstruct access to the handles on the storage container. Therefore, there is a need to provide a device that seals the cargo area of a vehicle between a truck bed cover and storage container that also does not obstruct access to the handles on the back side of the storage container.

Embodiments were conceived in light of the above-mentioned problems and limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations include a truck toolbox-bed cover interface having a frame rail support lip that is constructed to support a front frame rail of a truck bed cover. A first bed edge support constructed to rest on the top edge of a side wall of a truck bed and a second bed edge support constructed to rest on the opposing top edge of a side wall of a truck bed. The truck toolbox-bed cover interface can also include a handle recess area, having a first base and a second base, wherein the first base of the handle recess area has a slope toward a first drain hole and, the second base of the handle recess area has a slope toward a second drain hole. The truck toolbox-bed cover interface further includes a toolbox attachment edge constructed to attach to a back side of a toolbox.

In some implementations, the truck toolbox-bed cover interface is made of one or more of plastic, metal, stone, wood, natural, synthetic, or composite material.

In some implementations, the drain holes of the truck toolbox-bed cover interface are constructed to connect to respective drain hoses, which are routed to a drain hole to drain water to an area outside of the truck bed.

A truck bed toolbox having an integrated truck toolbox-bed cover interface, wherein the truck toolbox-bed cover interface includes a frame rail support lip constructed to support a front frame rail of a truck bed cover, and a first bed edge support constructed to rest on a top edge of a side wall of a truck bed and a second bed edge support constructed to rest on an opposing top edge of a side wall of a truck bed. The truck toolbox-bed cover interface can also include a handle recess area, having a first base and a second base, wherein the first base of the handle recess area slopes toward a first drain hole and, the second base of the handle recess area slopes toward a second drain hole, and a toolbox attachment edge constructed to attach to a back side of the toolbox.

In some implementations, the truck bed toolbox can include one of a cooler rail or a tactical rail.

Some implementations can include a truck bedcover having an integrated truck toolbox-bed cover interface, wherein the truck toolbox-bed cover interface includes a frame rail support lip constructed to support a front frame rail of a truck bed cover, and a first bed edge support constructed to rest on a top edge of a side wall of a truck bed and a second bed edge support constructed to rest on an opposing top edge of a side wall of a truck bed. The truck toolbox-bed cover interface can also include a handle recess area, having a first base and a second base, wherein the first base of the handle recess area slopes toward a first drain hole and, the second base of the handle recess area slopes toward a second drain hole, and a toolbox attachment edge constructed to attach to a back side of the toolbox.

In some implementations, the truck bedcover is one of a hard retractable cover or a hard folding cover.

Some implementations can include an integrated assembly including a truck bed toolbox, a bedcover, and a truck toolbox-bed cover interface. In some implementations, the bedcover extends over top of the truck bed toolbox when the bedcover is extended. In some implementations, the bedcover can be retracted to reveal a toolbox, extended to a first position in which the toolbox is covered and extended to a second position in which the toolbox and the truck bed is covered.

DETAILED DESCRIPTION

Figure 1:
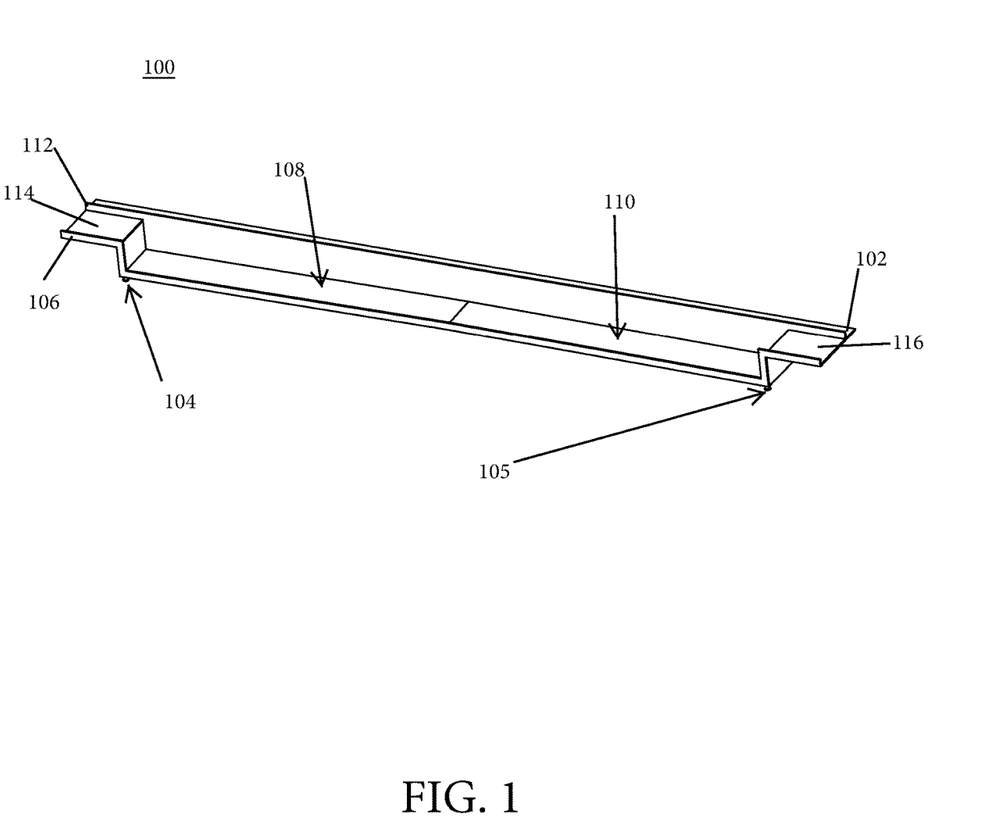
FIG. 1 is a top front view diagram of an example truck toolbox-bed cover interface in accordance with some implementations.

FIG. 1 is a top front view diagram of an example truck toolbox-bed cover interface 100 in accordance with some implementations. The truck toolbox-bed cover interface 100 includes a frame rail support lip 102, a first drain hole 104, a second drain hole 105, a toolbox attachment edge 106, a first base 108, a second base 110, a handle recess area 112, a first bed edge support 114, and a second bed edge support 116.

Figure 2:
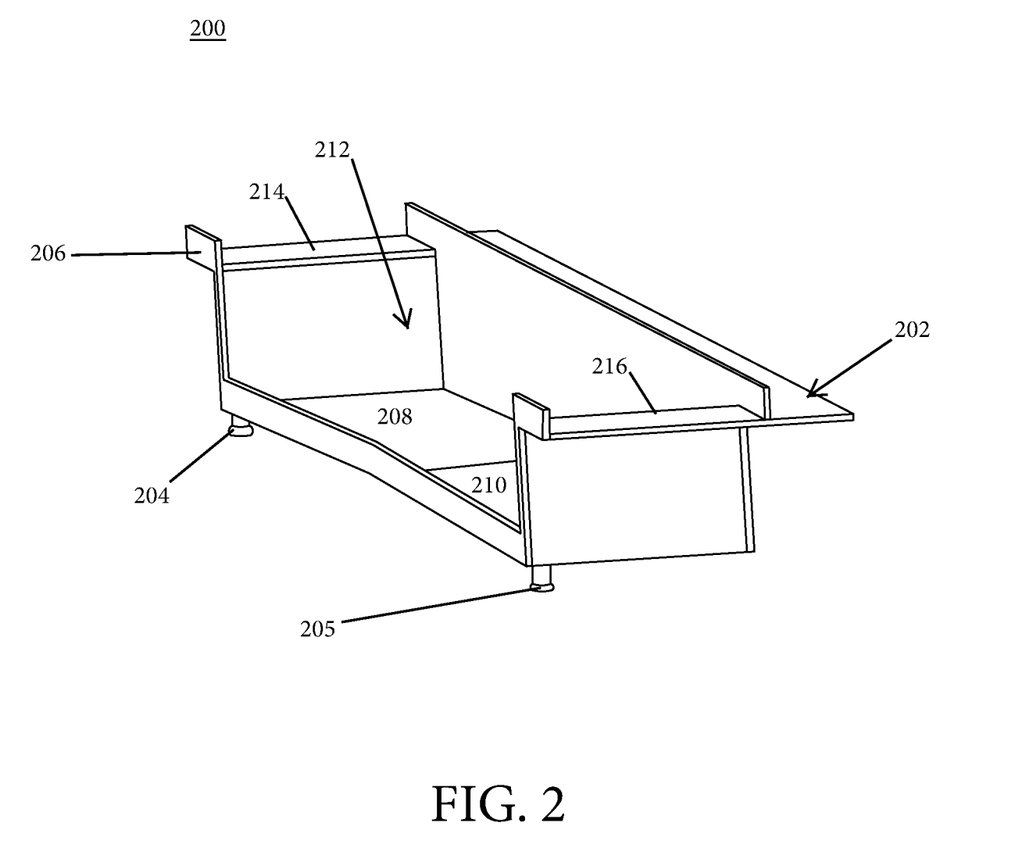
FIG. 2 is a side perspective view diagram of an example truck toolbox-bed cover interface in accordance with some implementations.

FIG. 2 is a side perspective view diagram of an example truck toolbox-bed cover interface in accordance with some implementations. The truck toolbox-bed cover interface 200 includes a frame rail support lip 202, a first drain hole 204, a second drain hole 205, a toolbox attachment edge 206, a first base 208, a second base 210, a handle recess area 212, a first bed edge support 214, and a second bed edge support 216.

Figure 3:
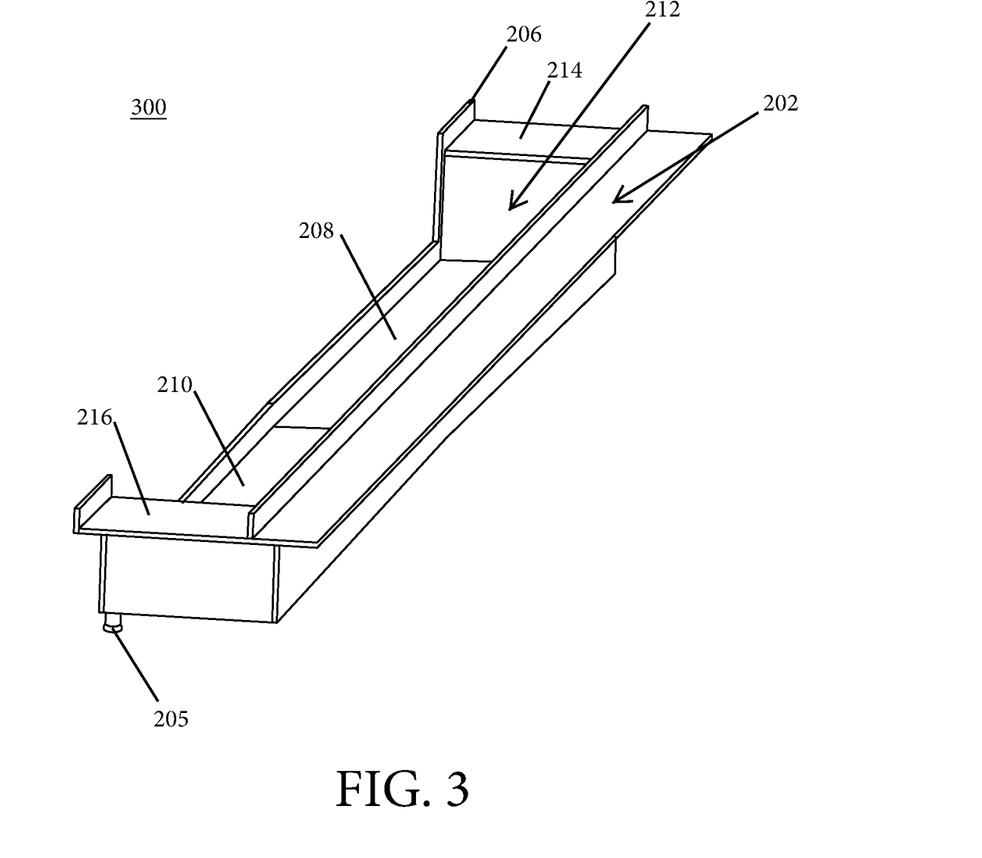
FIG. 3 is a top rear-view diagram of an example truck toolbox-bed cover interface in accordance with some implementations.

FIG. 3 is a top rear-view diagram of an example truck toolbox-bed cover interface in accordance with some implementations. The truck toolbox-bed cover interface 300 includes a frame rail support lip 202, a first drain hole 204, toolbox attachment edge 206, a first drain slope 208, a second drain slope 210, a handle recess area 212, a first bed edge support 214, and a second bed edge support 216.

Figure 4:
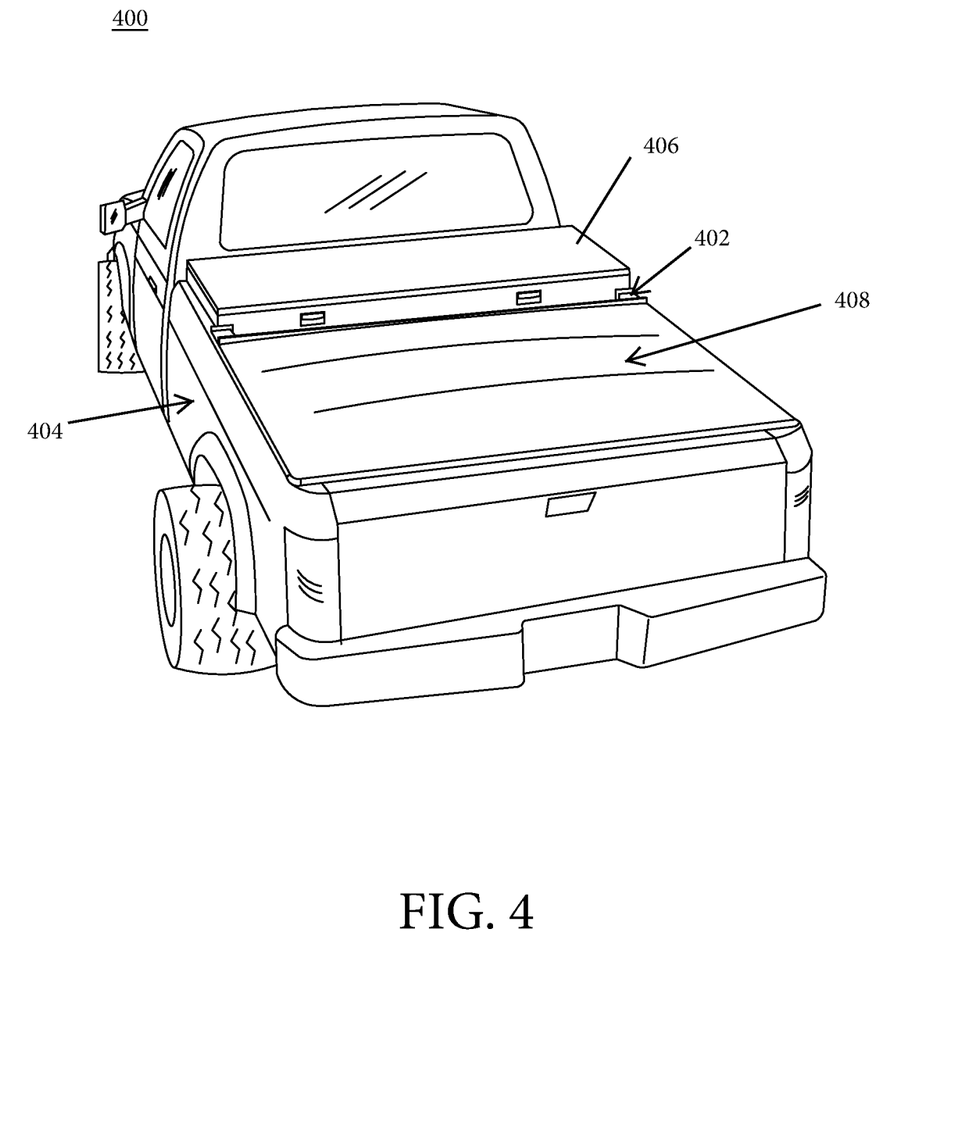
FIG. 4 is a top rear-view diagram of an example truck toolbox-bed cover interface installed on a truck bed in accordance with some implementations.

FIG. 4 is a top rear-view diagram of an example truck toolbox-bed cover interface 400 installed on a truck bed in accordance with some implementations. The truck toolbox-bed cover interface 400 includes a truck toolbox-bed cover interface 402 installed on a truck bed 404 to provide an interface between a toolbox 406 and a truck bed cover 408.

The frame rail support lip 102 is constructed to support a front frame rail of a truck bed cover 408. The first bed edge support 114 is constructed to rest on the top edge of a side wall of the truck bed 404 and the second bed edge support 116 is constructed to rest on the opposing top edge of a side wall of the truck bed 404.

The handle recess area 112 includes the first base 108 and the second base 110, the first base 108 of the handle recess area having a slope toward a first drain hole 104 and, the second base 110 of the handle recess area 112 having a slope toward the second drain hole.

The toolbox attachment edge is constructed to attach to a back side of a toolbox and provide a waterproof connection. The toolbox attachment edge can be secured to a toolbox via fasteners (e.g., double sided tape, glue, screws, bolts, etc.)

Figure 5:
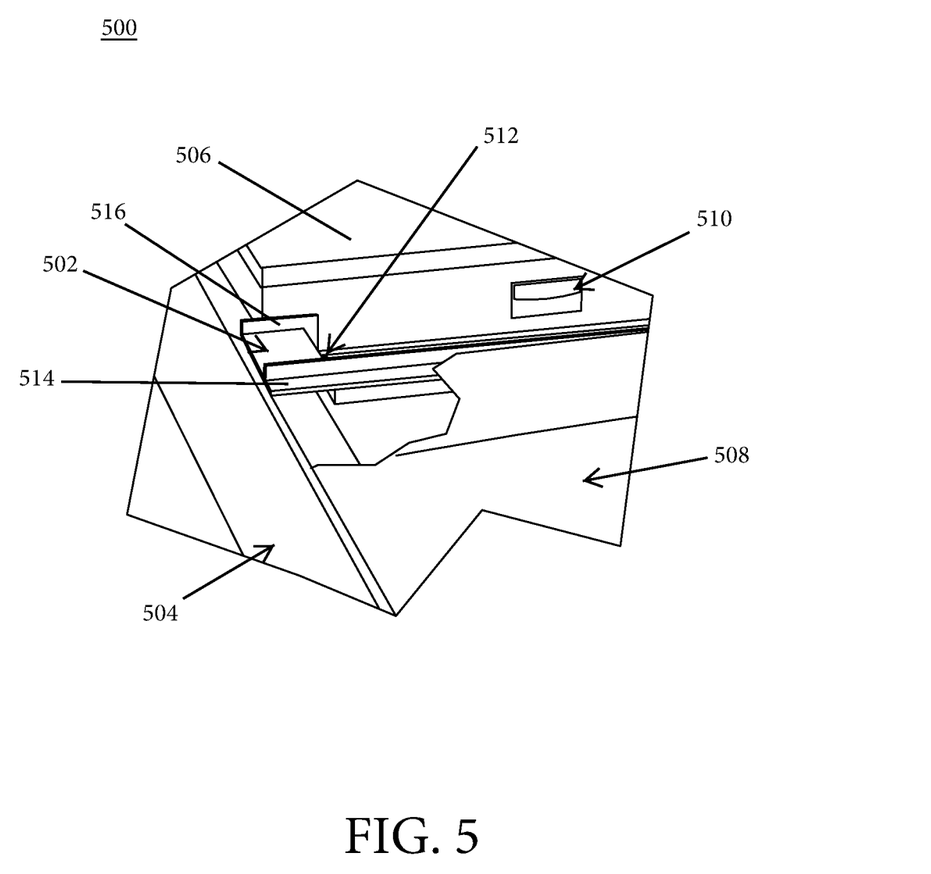
FIG. 5 is a diagram showing a closeup view of an example truck toolbox-bed cover interface installed on a truck bed in accordance with some implementations.

FIG. 5 is a diagram showing a closeup view of an example truck toolbox-bed cover interface 500 installed on a truck bed in accordance with some implementations. The truck toolbox-bed cover interface 500 shows a truck toolbox-bed cover interface 502 installed on a truck bed 504 having a tool box 506, a truck bed cover 508, a tool box handle 510, a second drain holes 512, and a frame rail support lip 514.

The drain holes (204 and 205) are constructed to connect to drain hoses that can be routed to an area outside of the truck bed 504 to remove water collecting in the trough to an area outside of the truck bed.

Figure 6:
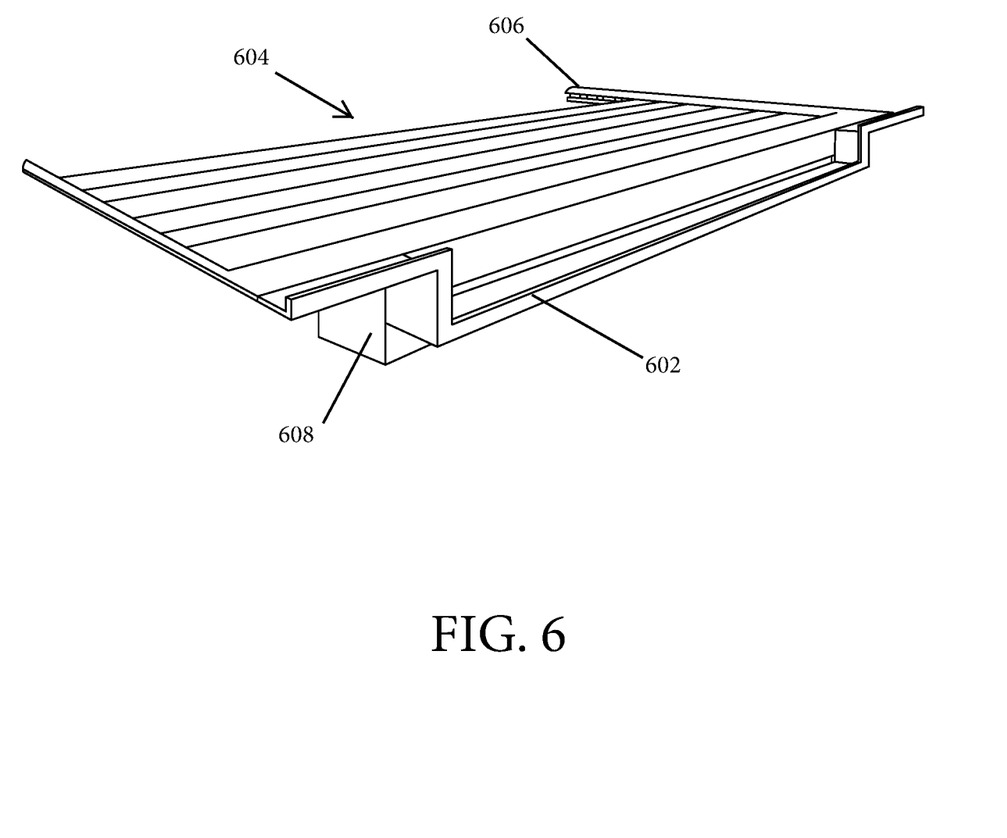
FIG. 6 is a diagram of an example retractable bedcover with an integrated truck toolbox-bed cover interface in accordance with some implementations.

FIG. 6 is a diagram of an example retractable bedcover 604 with an integrated truck toolbox-bed cover interface 602 in accordance with some implementations. The retractable bedcover 604 is guided by tracks 606. The integrated truck toolbox-bed cover interface 602 includes a canister (or retainer) configured to hold the retracted bedcover 608.

Figure 7:
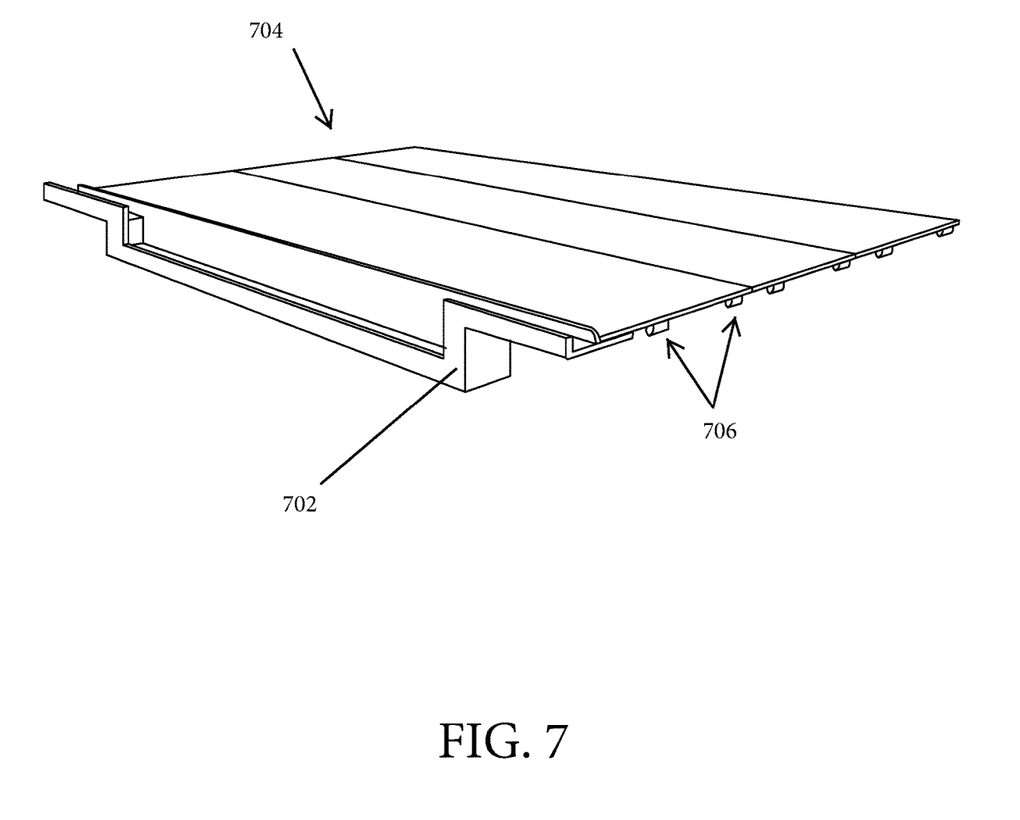
FIG. 7 is a diagram of an example hard folding bedcover with an integrated truck toolbox-bed cover interface in accordance with some implementations.

FIG. 7 is a diagram of an example hard folding bedcover 704 (e.g., tri-fold bedcover) with an integrated truck toolbox-bed cover interface 702 in accordance with some implementations. The hard folding bedcover 704 includes mounting points 706 that attach to the bed via fasteners such as screws and apply upward pressure to the bed rails.

Figure 8:
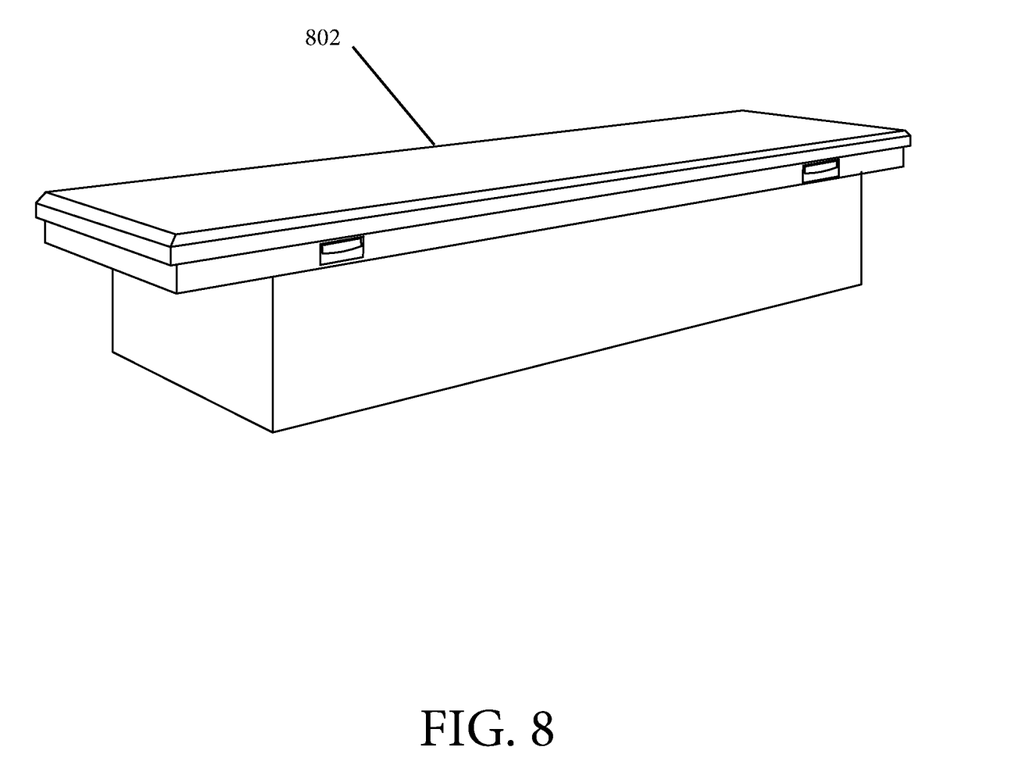
FIG. 8 is a diagram of an example truck toolbox in accordance with some implementations.

FIG. 8 is a diagram of an example truck toolbox in accordance with some implementations.

Figure 9A:
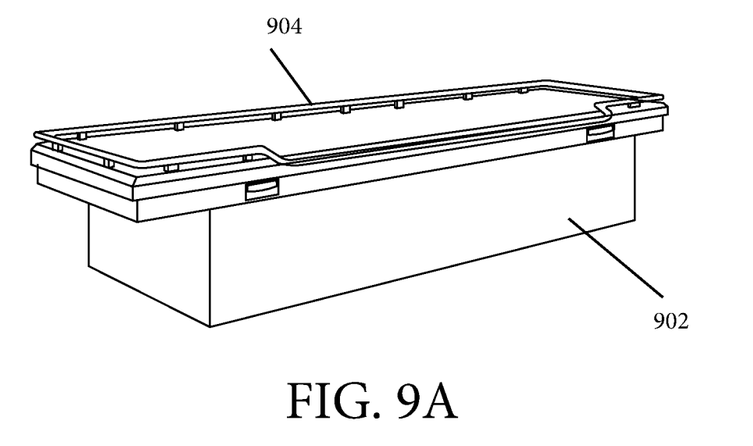
FIGS. 9A and 9B are diagrams of an example truck toolbox with a cooler rail in accordance with some implementations.
Figure 9B:
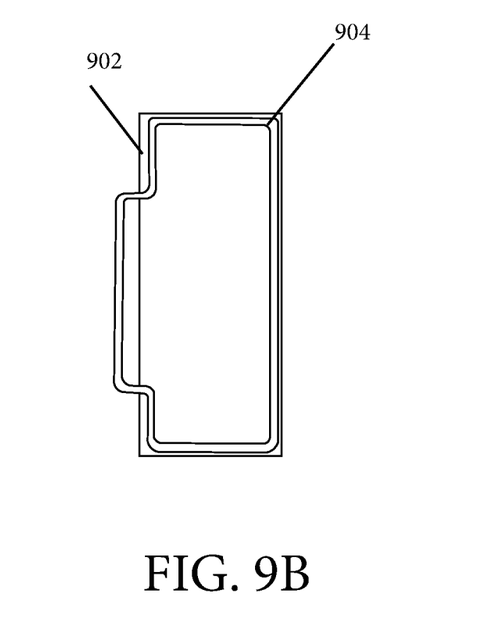

FIGS. 9A and 9B are diagrams of an example truck toolbox 902 with a cooler rail 904 in accordance with some implementations. The rail includes an extended area configured to accommodate the base of a cooler set on top of the toolbox where the rail helps prevent the cooler from shifting position.

Figure 10:
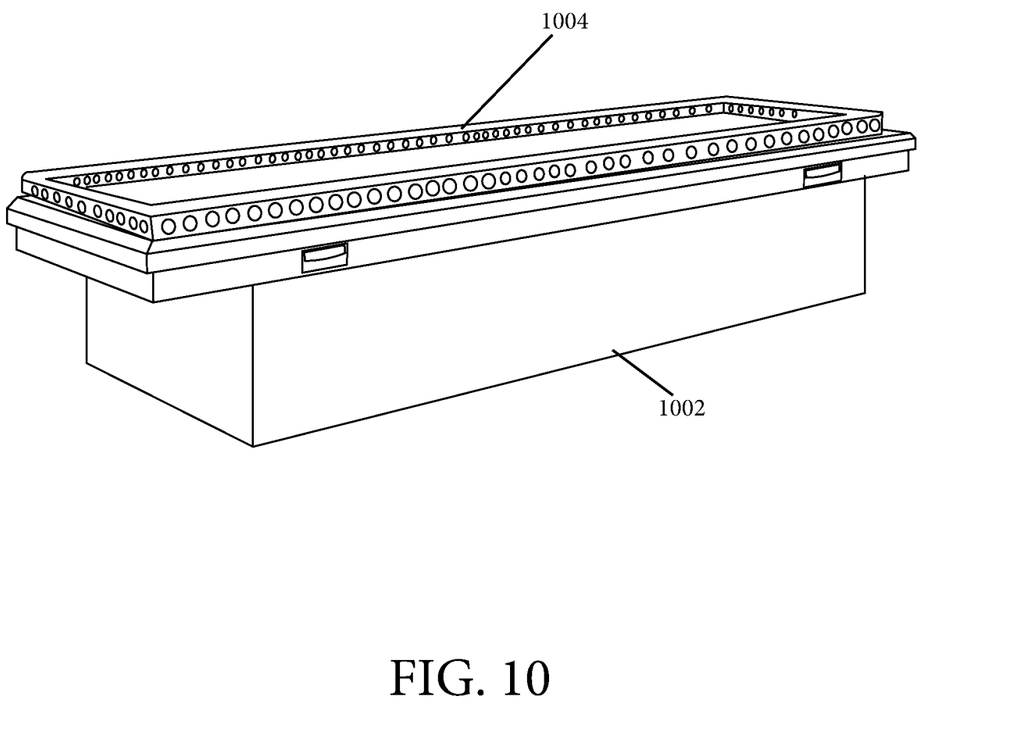
FIG. 10 is a diagram of an example truck toolbox with a tactical rail in accordance with some implementations.

FIG. 10 is a diagram of an example truck toolbox 1002 with a tactical rail 1004 in accordance with some implementations. The tactical rail 1004 provides versatility for the tactical rail 1004 as a mounting system. The tactical rail 1004 is configured to secure items to the vehicle, bed, and even just to the top of the tool box lid.

Figure 11:
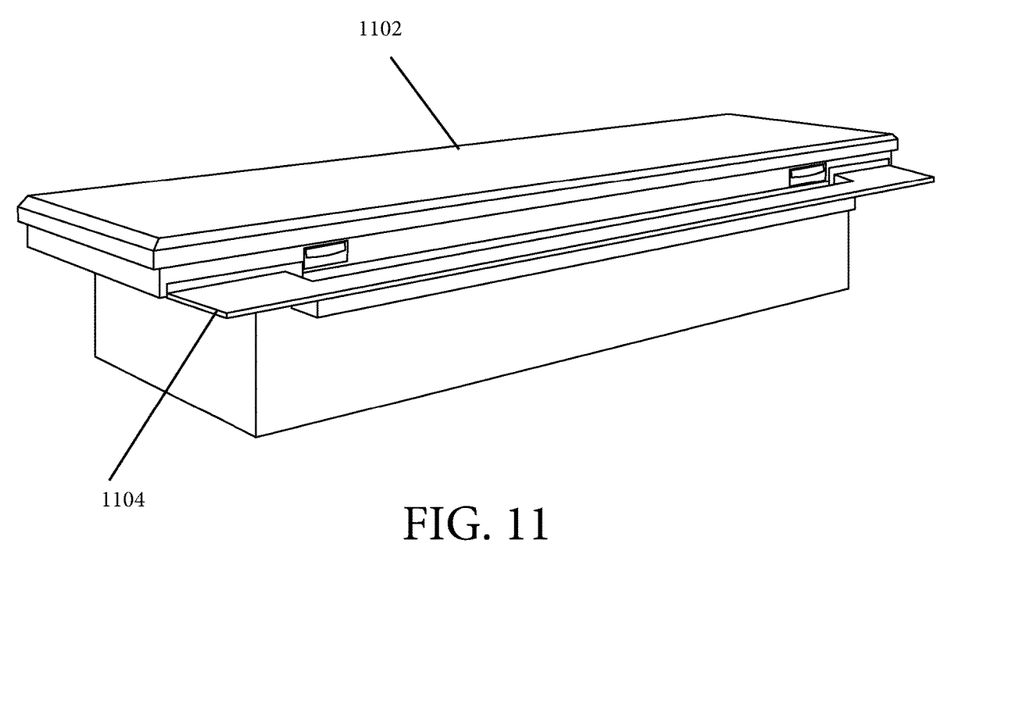
FIG. 11 is a diagram of an example truck toolbox with an integrated truck toolbox-bed cover interface in accordance with some implementations.

FIG. 11 is a diagram of an example truck toolbox 1102 with an integrated truck toolbox-bed cover interface 1104 in accordance with some implementations.

Figure 12:
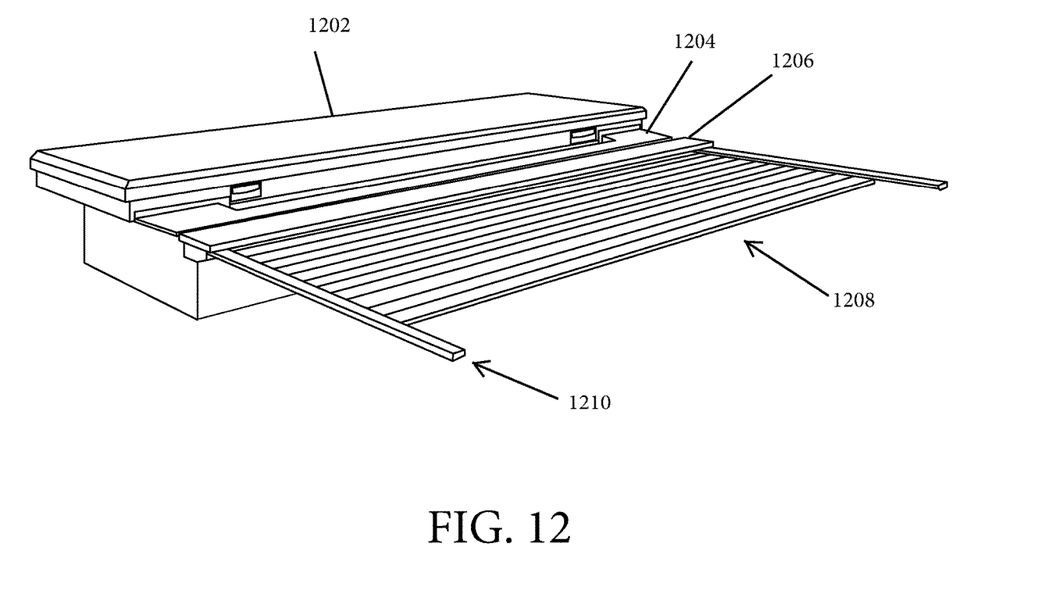
FIG. 12 is a diagram of an example truck toolbox with an integrated retractable bed cover and truck toolbox-bed cover interface in accordance with some implementations.

FIG. 12 is a diagram of an example truck toolbox 1202 with an integrated retractable bed cover 1208 and truck toolbox-bed cover interface 1204 in accordance with some implementations. The retractable bed cover 1208 is guided by rails 1210 and retracts into a cover retaining section 1206.

Figure 13:
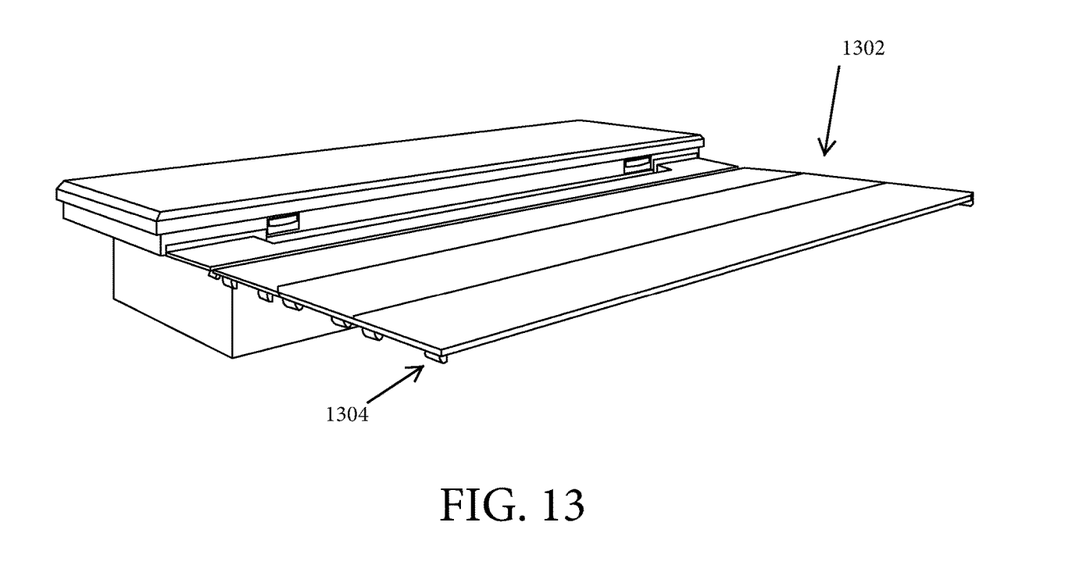
FIG. 13 is a diagram of an example truck toolbox with an integrated hard folding bed cover and truck toolbox-bed cover interface in accordance with some implementations.

FIG. 13 is a diagram of an example truck toolbox 1302 with an integrated hard folding bed cover 1304 and truck toolbox-bed cover interface 1306 in accordance with some implementations.

Figure 14A:
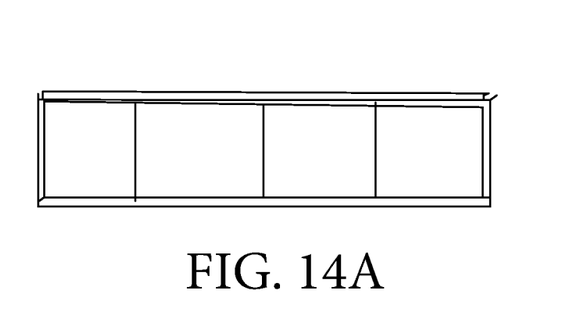
FIGS. 14A-14C are diagrams of an example retractable truck bed cover with an integrated toolbox in accordance with some implementations.
Figure 14B:
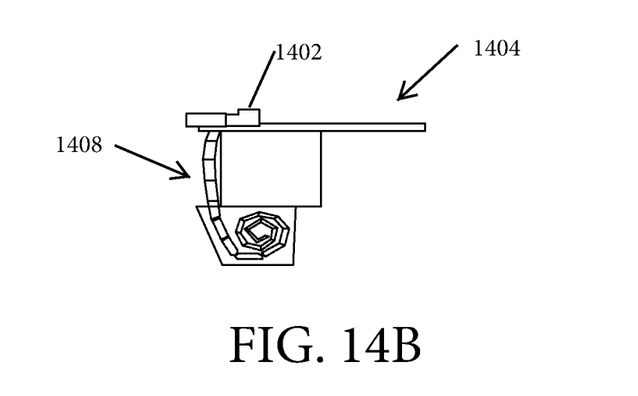
Figure 14C:
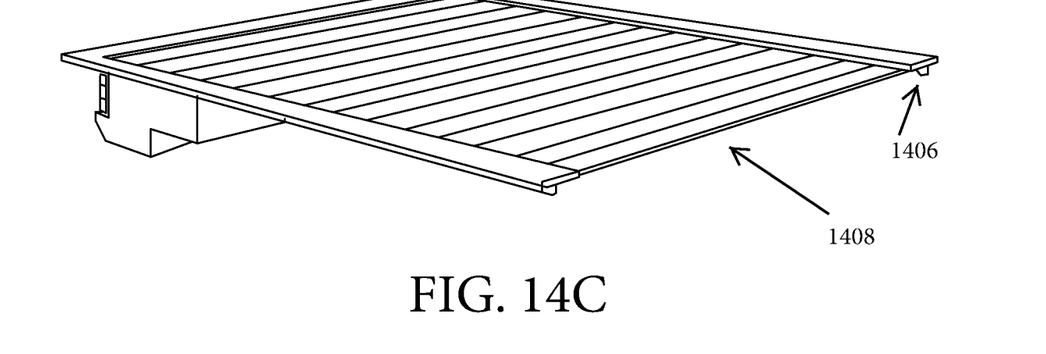

FIGS. 14A-14C are diagrams of an example retractable truck bed cover 1408 with an integrated toolbox 1404 in accordance with some implementations. The retractable truck bed cover 1408 is guided by rails 1406 and retracts to reveal an open top of the integrated toolbox 1404 (as shown in the top view of FIG. 14A). The retractable cover includes a cover stop 1402 that prevents the cover from retracting past a given point. The retractable truck bed cover 1408 retracts into a cover retaining section 1410. When the retractable truck bed cover 1408 is extended to cover the truck bed, the retractable truck bed cover 1408 also cover the integrated toolbox. 1404. Some implementations provide a configuration in which minimal space is needed to house the canisters for holding retracted bed covers. For example, the configuration shown in FIG. 14A-14C provides an ability to lock at multiple positions on the rail so it can be a full bedcover (e.g., a first position) or just a lid for its own toolbox (e.g., a second position) ensuring the use of the bed as if it were just a toolbox alone.

Some implementations can be configured to work with various types of truck bed covers including, but not limited to, soft roll-up covers, hard roll-up covers, soft folding covers, hard folding covers (e.g., tri-fold covers), retractable covers, and one-piece solid covers.

While some example implementations have been described in terms of a general embodiment with several specific example modifications, it is recognized that other modifications, implementations, and variations of the embodiments described above are within the spirit and scope of the disclosed subject matter. Applicants intend to embrace any and all such modifications, variations, embodiments, and implementations.

What is claimed is:

1. A truck toolbox-bed cover interface comprising:
   a frame rail support lip constructed to support a front frame rail of a truck bed cover;
   a first bed edge support constructed to rest on a top edge of a side wall of a truck bed and a second bed edge support constructed to rest on an opposing top edge of a side wall of a truck bed;
   a handle recess area, having a first base and a second base, wherein the first base of the handle recess area slopes toward a first drain hole and, the second base of the handle recess area slopes toward a second drain hole; and
   a toolbox attachment edge constructed to attach to a back side of a toolbox.

2. The truck toolbox-bed cover interface of claim 1, wherein the truck toolbox-bed cover interface is formed of metal or plastic.

3. The truck toolbox-bed cover interface of claim 1, wherein the drain holes are constructed to connect to drain hoses, wherein the drain hoses are routed to an area outside of the truck bed.

4. A truck bed toolbox having an integrated truck toolbox-bed cover interface, wherein the truck toolbox-bed cover interface includes:
   a frame rail support lip constructed to support a front frame rail of a truck bed cover;
   a first bed edge support constructed to rest on a top edge of a side wall of a truck bed and a second bed edge support constructed to rest on an opposing top edge of a side wall of a truck bed;
   a handle recess area, having a first base and a second base, wherein the first base of the handle recess area slopes toward a first drain hole and, the second base of the handle recess area slopes toward a second drain hole; and
   a toolbox attachment edge constructed to attach to a back side of the toolbox.

5. The truck bed toolbox of claim 4, further comprising one of a cooler rail or a tactical rail.

6. A truck bed cover having an integrated truck toolbox-bed cover interface, wherein the truck toolbox-bed cover interface includes:
   a frame rail support lip constructed to support a front frame rail of a truck bed cover;
   a first bed edge support constructed to rest on a top edge of a side wall of a truck bed and a second bed edge support constructed to rest on an opposing top edge of a side wall of a truck bed;
   a handle recess area, having a first base and a second base, wherein the first base of the handle recess area slopes toward a first drain hole and, the second base of the handle recess area slopes toward a second drain hole; and
   a toolbox attachment edge constructed to attach to a back side of the toolbox.

7. The truck bedcover of claim 6, wherein the truck bed cover is one of a hard retractable cover or a hard folding cover.

* * * * *